United States Patent
Thornton et al.

(10) Patent No.: US 10,480,287 B2
(45) Date of Patent: Nov. 19, 2019

(54) EPOXY-BASED SUBSEA INSULATION MATERIAL

(71) Applicant: Carboline Company, St. Louis, MO (US)

(72) Inventors: Benjamin Lee Thornton, St. Louis, MO (US); John Orlin Kloepper, Saint Charles, MO (US); Steve Vincent Liebhart, Saint Charles, MO (US)

(73) Assignee: Carboline Company, St. Louis, MO (US)

( * ) Notice: Subject to any disclaimer, the term of this patent is extended or adjusted under 35 U.S.C. 154(b) by 971 days.

(21) Appl. No.: 14/962,691

(22) Filed: Dec. 8, 2015

(65) Prior Publication Data

US 2016/0168951 A1    Jun. 16, 2016

Related U.S. Application Data

(60) Provisional application No. 62/091,246, filed on Dec. 12, 2014.

(51) Int. Cl.

| | |
|---|---|
| *C08G 59/50* | (2006.01) |
| *E21B 36/00* | (2006.01) |
| *B29B 7/00* | (2006.01) |
| *B29B 13/02* | (2006.01) |
| *B29C 45/00* | (2006.01) |
| *B29C 45/14* | (2006.01) |
| *C08J 3/24* | (2006.01) |
| *C08K 5/3447* | (2006.01) |
| *C08K 7/20* | (2006.01) |
| *C08L 63/00* | (2006.01) |
| *C08K 7/16* | (2006.01) |
| *C08K 7/22* | (2006.01) |
| *B29K 63/00* | (2006.01) |
| *B29K 105/20* | (2006.01) |
| *B29L 23/00* | (2006.01) |

(52) U.S. Cl.
CPC ............ *E21B 36/003* (2013.01); *B29B 7/002* (2013.01); *B29B 13/02* (2013.01); *B29C 45/0001* (2013.01); *B29C 45/14639* (2013.01); *C08J 3/24* (2013.01); *C08K 5/3447* (2013.01); *C08K 7/20* (2013.01); *B29K 2063/00* (2013.01); *B29K 2105/20* (2013.01); *B29K 2995/0015* (2013.01); *B29L 2023/225* (2013.01); *C08J 2383/10* (2013.01)

(58) Field of Classification Search
None
See application file for complete search history.

(56) References Cited

U.S. PATENT DOCUMENTS

| | | | |
|---|---|---|---|
| 3,722,591 A | 3/1973 | Maxson | |
| 3,742,985 A | 7/1973 | Rubenstein | |
| 4,061,579 A | 12/1977 | Sawko et al. | |
| 4,348,243 A | 9/1982 | Craubner | |
| 4,595,714 A | 6/1986 | McAlliser et al. | |
| 4,598,106 A | 7/1986 | Utsugi | |
| 4,695,603 A | 9/1987 | Inoue et al. | |
| 4,919,866 A * | 4/1990 | Kubbutat | C04B 26/14 264/259 |
| 5,162,397 A | 11/1992 | Descamps et al. | |
| 5,262,454 A | 11/1993 | Leroux et al. | |
| 5,582,249 A | 12/1996 | Caveny et al. | |
| 5,665,461 A * | 9/1997 | Wong | C08J 9/32 428/317.9 |
| 5,712,038 A | 1/1998 | Yamazaki et al. | |
| 5,981,610 A | 11/1999 | Meguriya et al. | |
| 6,031,026 A | 2/2000 | Tateyama et al. | |
| 6,153,294 A | 11/2000 | Patton et al. | |
| 6,196,316 B1 | 3/2001 | Bosma et al. | |
| 6,284,809 B1 | 9/2001 | Plummer et al. | |
| 6,365,268 B1 | 4/2002 | Williams et al. | |
| 6,520,261 B1 | 2/2003 | Janoff et al. | |
| 6,746,761 B2 | 6/2004 | Janoff et al. | |
| 6,892,817 B2 | 5/2005 | Janoff | |
| 2010/0297357 A1 * | 11/2010 | Mowrer | C08G 59/4042 427/407.1 |
| 2013/0291992 A1 * | 11/2013 | Wilmot | C08G 59/18 138/145 |

FOREIGN PATENT DOCUMENTS

| | | | | |
|---|---|---|---|---|
| EP | 1070906 A1 | 1/2001 | | |
| GB | 2400128 A | 10/2004 | | |
| WO | 1994029634 A1 | 12/1994 | | |
| WO | 2003004927 A1 | 1/2003 | | |
| WO | 2009085191 A2 | 7/2009 | | |
| WO | WO-2010069049 A1 * | 6/2010 | ............. | C08G 59/38 |
| WO | 2012030339 A1 | 3/2012 | | |

OTHER PUBLICATIONS

International Search Report for PCT/US2015/064475 (corresponding PCT application), dated Mar. 18, 2016.
"Textron System Announces Ty-Mar 10K, a New Thermal Insulation Maerial for Subsea", Apr. 28, 1998, Business Wire.
E&P Advanced Insulation Maintains Thermal Integrity of Subsea Systems, Feb. 1, 2010, www.epmag.com/Technology-Equipment/Advanced-Insulation-Maintains-Thermal-Integrity-of-Subsea-Systems, 3 pgs.
ContraTherm, Subsea Thermal Insulation for High Temperature and High Pressure Applications, Mar. 2012, 16 pgs.
Dow Coming XTI-1003 RTV Silcone Rubber Insulation, copyright 2013, Dow Corning Corporation, 8 pgs.

* cited by examiner

*Primary Examiner* — Michael J Feely
(74) *Attorney, Agent, or Firm* — Calfee, Halter & Griswold LLP

(57) ABSTRACT

An epoxy-based insulation material and a method of thermally insulating a subsea production apparatus are disclosed. The epoxy-based insulation material has an amine-cured epoxy elastomer matrix and a plurality of non-metallic beads suspended in the matrix. The epoxy-based insulation material is located on the subsea production apparatus to thermally insulate a hydrocarbon fluid from sea water.

12 Claims, No Drawings

EPOXY-BASED SUBSEA INSULATION MATERIAL

CROSS-REFERENCE TO RELATED APPLICATIONS

This application claims priority to and the benefit of U.S. Provisional Patent Application No. 62/091,246, filed Dec. 12, 2014, the entire content of which is incorporated by reference herein.

FIELD OF THE INVENTION

This invention relates to an epoxy-based insulation material for subsea oil and gas production equipment.

BACKGROUND OF THE INVENTION

The oil and gas industry utilizes deep water production well pipelines and associated processing equipment in subsea environments. These pipelines and equipment can be operated at depths greater than 5,000 ft below sea level, and potentially as deep as 12,000 feet below sea level. At these depths the process fluids coming out of the well head can exceed 300° F., while the surrounding sea water is generally only a few degrees above freezing, i.e., around 34° F. This temperature differential can cause the internal process fluid temperature to dip below 70° F. If the temperature of the process fluids are not maintained above 70° F., these fluids can condense and form thick hydrates, reducing the flow rate of the well head or possibly plugging the equipment completely. This can result in very expensive shutdowns and clean-outs, or possibly necessitate the re-drilling of the well. Moreover, ambient pressure at these depths can be greater than 5,000 psi. A protective insulation used to maintain the process fluid temperature above 70° F. also needs to have high compressive strength to withstand this pressure without cracking or disbonding from the substrate.

Because of the temperature differentials and pressure demands in subsea environments, insulation materials used on deep water production well pipelines and associated processing equipment need to withstand high pressure and protect against the extreme temperature differential. Additionally, insulating materials need to have good hydrolytic stability and not decompose under these high temperature and high pressure immersion conditions.

SUMMARY

The present application discloses exemplary embodiments of an amine-cured epoxy elastomer for use as thermal insulation for wells, pipelines, and associated processing equipment in subsea environments. By way of example to illustrate various aspects of the general inventive concepts, several exemplary embodiments of compositions and methods are disclosed herein.

In an exemplary embodiment, the present disclosure is directed to an epoxy-based insulation material for insulating a subsea production apparatus. The epoxy-based insulation material has an amine-cured epoxy elastomer matrix and a plurality of non-metallic beads suspended in the matrix. The epoxy matrix also comprises a relatively small amount of polysiloxane. The epoxy matrix comprises not greater than 10% polysiloxane in the matrix, including without limitation 1%-5%, 1%-10%, 5%-10%. In certain embodiments, the epoxy matrix comprises 1%-15%, 1%-20%, 1%-30%, 5%-30%, etc. The epoxy-based insulation material is located on the subsea production apparatus to thermally insulate a hydrocarbon fluid from sea water.

In an exemplary embodiment, the present disclosure is directed to an epoxy-based insulation material for insulating a subsea production apparatus. The epoxy-based insulation material is an amine cured epoxy elastomer matrix with a suspended uniform distribution of hollow glass spheres. This epoxy elastomer matrix contains no more than 10% polysiloxane, including without limitation 1%-5%, 1%-10%, 5%-10%. In certain embodiments, the epoxy matrix comprises 1%-15%, 1%-20%, 1%-30%, 5%-30%, etc.

In an exemplary embodiment, the present disclosure is directed to a method of thermally insulating a subsea production apparatus. The method comprises the steps of: providing a two-component epoxy; mixing component A and component B; installing component A and component B on at least a portion of the subsea production apparatus; and allowing the mixture to cure to form an amine-cured epoxy elastomer insulating material.

In an exemplary embodiment, the two-component epoxy comprises component A and component B. Component A comprises an epoxy resin diluent, an epoxy resin, a silane, a dispersive additive, a polyether siloxane, and an acrylic polymer. Component B comprises an aminopolysiloxane, at least one curing agent, an alkoxysilane, polyoxypropylenediamine, and at least one thickening agent. In an exemplary embodiment, Component B further comprises an accelerator. Both component A and component B further contain a plurality of non-metallic beads.

In an exemplary embodiment, the present disclosure is directed to a method of thermally insulating a subsea production apparatus comprising the steps of: providing an epoxy comprising component A and component B; mixing component A and component B; injecting components A and B into a molded form; and encapsulating at least a portion of the subsea production apparatus in the mold. The mixture of components A and B acts to insulate the subsea production apparatus. Component A is comprised of an epoxy resin diluent, an epoxy resin, a silane, a dispersive additive, a polyether siloxane, and an acrylic polymer. Component B is comprised of an aminopolysiloxane, at least one curing agent, an alkoxysilane, polyoxypropylenediamine, and at least one thickening agent. Both component A and component B further contain a plurality of non-metallic beads.

Examples of the subsea production apparatuses that can be insulated with the inventive epoxy matrix to prevent unacceptable cooling of hot crude oil include without limitation, wells, pipelines, Christmas trees and wellheads. This equipment is used in the transportation and flow control of hot crude oil from beneath the ocean floor to the surface where it is transferred to holding tanks for transportation to onshore processing facilities.

DETAILED DESCRIPTION

Several illustrative embodiments will be described in detail with the understanding that the present disclosure merely exemplifies the general inventive concepts. While embodiments encompassing the general inventive concepts may take various forms, the general inventive concepts are not intended to be limited to the specific embodiments described herein.

Deep water, subsea insulation composite materials are used on processing equipment during deep water oil and gas production to maintain the temperature of the internal process fluids, including gases. The term subsea as used herein refers essentially to technology, methods, processes or equipment used in the oil and gas industry which are primarily used or situated beneath the surface of the sea, including without limitation, offshore oil and gas developments and underwater mining.

The present invention is an epoxy-based insulation material that exhibits tough, resilient and flexible properties specifically developed to provide thermal insulation to subsea oil wells, pipelines, and associated equipment in subsea environments. Its extreme mechanical properties make it suitable to use on hot pipe having temperatures as high as 300° F. (149° C.) and under extreme pressures of over 5,000 psi, including without limitation 4,500 psi, in depths up to 12,000 feet where the seawater temperatures are as low as 34° F. (1.1° C.). In certain embodiments, the epoxy-based insulation material is suitable for use on hot pipe having temperatures as high as 350° F. (177° C.). The epoxy-based insulation material is ideal for jumpers and short pipe runs where a flexible, non-cracking thermal insulation is preferred for providing flow assurance to prevent reduced flow rates or equipment plugging.

As detailed herein, the epoxy-based insulation material features low thermal conductivity, flexibility, and flowability for castable applications. The epoxy-based insulation material has a long working time for ease of application and is tough and resilient to handle shipping and installation. The epoxy-based insulation material tolerates extreme pressures of over 5,000 psi, including without limitation 4,500 psi, at extreme depths of over 12,000 feet or over 3,600 meters. It is dimensionally stable under extreme subsea exposures.

In certain embodiments, the epoxy-based insulation material of the present invention may have a yellow or white color. It may have a solids content of 100%+/−2% by volume.

The epoxy-based insulation material for insulating a subsea production apparatus has an amine-cured epoxy elastomer matrix and a plurality of non-metallic beads suspended in the matrix. The epoxy matrix also comprises a relatively small amount of polysiloxane. In an exemplary embodiment, at least a portion of the polysiloxane is reacted in the backbone of one of the amine curing agents. Specifically, the polysiloxane is present as an aminopolysiloxane. The epoxy matrix comprises not greater than 10% polysiloxane, including without limitation 1%-5%, 1%-10%, 5%-10%. In certain embodiments, the epoxy matrix comprises 1%-15%, 1%-20%, 1%-30%, 5%-30%, etc. The epoxy-based insulation material is located on the subsea production apparatus to thermally insulate a hydrocarbon fluid from sea water.

In an exemplary embodiment, the present disclosure is directed to an epoxy-based insulation material for insulating a subsea production apparatus. The epoxy-based insulation material is an amine cured epoxy elastomer matrix with a suspended uniform distribution of hollow glass spheres. This epoxy elastomer matrix contains no more than 10% polysiloxane, including without limitation 1%-5%, 1%-10%, 5%-10%. In certain embodiments, the epoxy matrix comprises 1%-15%, 1%-20%, 1%-30%, 5%-30%, etc.

In an exemplary embodiment, the amine-cured epoxy elastomer matrix is formed by a reaction of a two-component epoxy having component A and component B. Component A comprises an epoxy resin diluent, an epoxy resin, a silane, a dispersive additive, a polyether siloxane, and an acrylic polymer. Component B comprises an aminopolysiloxane, at least one curing agent, an alkoxysilane, polyoxypropylenediamine, and at least one thickening agent. Both component A and component B further contain a plurality of non-metallic beads.

In accordance with one embodiment, the epoxy resin diluent may be Epotuf® 37051, which is available from Reichhold Inc. The epoxy resin may be Epalloy 5000, which is available from CVC Emerald Performance Materials. The silane may be Silquest A-187, which is available from Momentive. The dispersive additive may be Anti-Terra-U 100, available from Byk Additives and Instruments. The polyether siloxane may be Tego Wet 270, which is available from Evonik Industries. The acrylic polymer may be Modaflow available from Allnex USA Inc.

In accordance with one embodiment, the aminopolysiloxane may be C1008, which is available from Milliken Chemical. In accordance with one embodiment, the aminopolysiloxane may be an aminoalkyl-terminated polydimethylsiloxane. In accordance with one embodiment, the aminoalkyl-terminated polydimethylsiloxane is WACKER® FLUID NH 15 D, which is available from Wacker Chemie AG. In accordance with one embodiment, the aminopolysiloxane may be a linear aminated polydimethylsiloxane or a di-methyl-3-aminopropyl terminated polysiloxane. In accordance with one embodiment, the linear aminated polydimethylsiloxane is Silmer NH Di-8, which is available from Siltech Corp. In certain embodiments the aminopolysiloxane may be di-methyl-3-aminopropyl terminated polysiloxane of the formula shown in Equation 1.

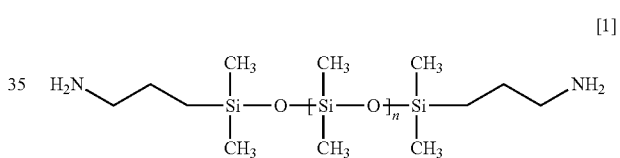

[1]

In accordance with one embodiment, the alkoxysilane may be Xiameter OFS 6020 silane, which is available from Dow Corning Corporation. The polyoxypropylenediamine may be Jeffamine D-2000/Poly-A 27-2000, which is available from Huntsman Corporation. At least one of the thickening agents may be Aerosil R202, which is a fumed silica after treated with a polydimethylsiloxane available from Evonik Industries AG.

In an exemplary embodiment, component A further contains a rheological additive. In an exemplary embodiment, component B further contains a rheological additive. In an exemplary embodiment, component B further contains an accelerator. The rheological additive may be modified urea. In certain embodiments, the rheological additive may be Byk 410 (Mod Urea Soln Thixotrope), which is available from BYK USA Inc.

In an exemplary embodiment, the accelerator is 2,4,6-tri(dimethylaminomethyl) phenol. In an exemplary embodiment, the curing agent may be a polyamine. In an exemplary embodiment, the curing agent may be a cycloaliphatic amine. At least one of the curing agents may be Amicure Cycloaliphatic Amine (PACM) available from Air Products and Chemicals, Inc. An additional curing agent may be IPD Adduct 7181 available from Air Products and Chemicals, Inc. At least one of the curing agents may be Ancamine K54, available from Air Products and Chemicals, Inc. Additionally a curing agent may be polyamine, specifically Epikure 3378, available from Momentive Specialty Chemicals, Inc.

In an exemplary embodiment, component A, component B, or both component A and component B further contain a pigment. In an exemplary embodiment, the pigment may be a benzimidazolone pigment. The benzimidazolone pigment may be Hostaperm Yellow H4G (PY 151 Benzimidazolone), which is available from Clariant International Ltd.

In an exemplary embodiment, the non-metallic beads may be made of glass, ceramic, plastic or any other non-metallic substance. In an exemplary embodiment, the non-metallic beads may be bubbles, spheres, microspheres, or any other bead-like filler material. In an exemplary embodiment, the non-metallic beads may be glass bubbles, hollow ceramic microspheres, hollow glass spheres, or any non-metallic filler. In an exemplary embodiment, the non-metallic beads S42XHS glass bubbles types K and S, which are available from 3M.

In an exemplary embodiment, the epoxy-based insulation material as a whole has an ASTM D630 elongation of between 5% to 50%, including without limitation at least 15%. The epoxy-based insulation material has a Shore D hardness of between 20 to 85 before being exposed to water, including without limitation a Shore D hardness of 55 before being exposed to water. The epoxy-based insulation material has a Shore D hardness of between 20 to 85 after being exposed to water at 250° F. for 5 weeks, including without limitation a Shore D hardness of 30 after being exposed to water at 250° F. for 5 weeks. The epoxy-based insulation material has an ASTM D630 tensile strength of between 500 to 5,000 psi, including without limitation 1,500 psi (10.34 Mpa). The epoxy-based insulation material has an ASTM C518 thermal conductivity of between 0.0835 W/m° K to 0.334 W/m° K, including without limitation 0.167 W/m° K at between 86° F. and 140° F.

In an exemplary embodiment, the present disclosure is directed to a method of thermally insulating a subsea production apparatus. The method comprises the steps of: providing a two-component epoxy; mixing greater than 1 part by volume of component A with 1 part by volume of component B; installing the insulating material on at least a portion of the subsea production apparatus; and allowing the mixture to cure to form an amine-cured epoxy elastomer insulating material. The two-component epoxy comprises component A and component B. The volumetric ratio of component A to component B may be greater than 1 part component A to 1 part component B, including without limitation, 1.1A:1B, 1.2A:1B, 1.3A:1B, 1.4A:1B, 1.5A:1B, 1.6A:1B, 1.7A:1B, 1.8A:1B, 1.9A:1B, 2A:1B, 3A:1B, 4A:1B, etc.

Component A comprises an epoxy resin diluent, an epoxy resin, a silane, a dispersive additive, a polyether siloxane, and an acrylic polymer. Component B comprises an aminopolysiloxane, at least one curing agent, an alkoxysilane, polyoxypropylenediamine, and at least one thickening agent. Both component A and component B further contain a plurality of non-metallic beads.

In an exemplary embodiment, the present disclosure is directed to a method of thermally insulating a subsea production apparatus comprising the steps of: providing an epoxy; mixing component A and component B; injecting components A and B into a molded form; and encapsulating at least a portion of the subsea production apparatus in the mold. The mixture of components A and B acts to insulate the subsea production apparatus. The epoxy comprises component A and component B. Component A comprises an epoxy resin diluent, an epoxy resin, a silane, a dispersive additive, a polyether siloxane, and an acrylic polymer. Component B comprises an aminopolysiloxane, at least one curing agent, an alkoxysilane, polyoxypropylenediamine, and at least one thickening agent. Both component A and component B further contain a plurality of non-metallic beads.

In an exemplary embodiment, the method further comprises the step of: heating components A and B. The mixture may be heated to between 70° F. and 350° F., including without limitation between 120° F. and 150° F. The method may further comprise the step of: allowing components A and B to cure for between 30 minutes to 24 hours, including without limitation between 4 to 6 hours.

In certain embodiments of the method, the mixing may occur by hand. A power mixer may be used to provide the mixing. Components A and B may be pumped through a heated plural component spray pump. The mixture may be pumped through a manifold. The manifold may have static mixers.

In an exemplary embodiment, the method may employ circulating air at a temperature greater than 75° F. through at least the portion of the subsea production apparatus being insulated.

Substrates & Surface Preparation

Examples of the subsea production apparatuses that can be insulated with the inventive epoxy matrix to prevent unacceptable cooling of hot crude oil include without limitation, wells, pipelines, Christmas trees and wellheads. For applications using steel, decontaminate surfaces as needed. Additionally, the surfaces may be abrasive cleaned to a specified SSPC (Steel Structures Painting Council) standard. In an exemplary embodiment, the cleaning may be per SSPC SP-10 (Near White Metal Condition) and may produce a specified anchor pattern or surface profile, including without limitation a 3½ mil (0.09 mm) surface profile. The surfaces may be sweep-blasted to remove flash rust, if any, before coating. If possible, the steel should be dry and dust-free before coating. In one exemplary embodiment. application to wet steel is not recommended. The epoxy-based insulation material may be applied over recommended primers.

Mixing & Thinning

In an exemplary embodiment, the epoxy-based insulation material is hand mixed at room temperature of 75° F. (24° C.) and the gel time may be approximately 4 hours or more. However, a variety of mixing temperatures may be used, which may result in varying gel times. The mixture may be heated to between 70° F. and 350° F., including without limitation between 120° F. and 150° F. In an exemplary embodiment, the gel time at 120° F. (49° C.) may be approximately 30 minutes or less. In an exemplary embodiment, the gel time at 150° F. (66° C.) may be less than 30 minutes. Both components A and B may be power mixed separately with an agitator or mixer until homogenous prior to use. In certain embodiments, mixing can take up to 20-30 minutes in a drum container. Materials are normally combined through the use of a plural component mixing equipment. However, hand mixing may be used for small area applications or repairs. In certain embodiments, reaction injection molding (RIM) may be employed to allow the curing reaction to take place. In an exemplary embodiment, the mixing ratio by volume for the epoxy-based insulation material is 2 parts component A to 1 part component B (2A:1B). However, other volumetric mixing ratios may be used and are contemplated within the scope of the invention. In certain embodiments, the volumetric ratio of component A to component B may be 1 part component A to 1 part component B or greater than 1 part component A to 1 part component B, including without limitation, 1.1A:1B, 1.2A:1, 1.3A:1B, 1.4A:1B, 1.5A:1B, 1.6A:1B, 1.7A:1B, 1.8A:1B, 1.9A:1B, 2A:1B, 3A:1B, 4A:1B, etc.

Application Equipment Guidelines

Listed below are general equipment guidelines for the application of epoxy-based insulation material of the instant invention. However, job site conditions may require modifications to these guidelines to achieve the desired results. Modifications to the equipment guidelines are contemplated within the scope of the invention. In general, the epoxy-based insulation material may be cast into a cavity created by a mold that has been configured around a pipe or piece of equipment, including without limitation wells, pipelines, Christmas trees and wellheads. In certain embodiments, the epoxy-based insulation material maybe be applied through plural-component equipment designed for molded applications. Plural component spray equipment with a high pressure airless proportioned pump with any of the A to B volumetric ratios listed herein can be used. In certain embodiments, other volumetric ratios may be used. However, care should be taken to reduce the possibility of introducing air into the epoxy-based insulation material.

The components A and B of the epoxy-based insulation material may be pumped through a heated plural component spray pump and pumped through a manifold fitted with static mixers. The materials may be heated and then injected or pumped into a mold formed around the pipe or piece of equipment, including without limitation wells, pipelines, Christmas trees and wellheads. In an exemplary embodiment, the material will flow and encapsulate all surfaces including bolts, edges and welds and is cast at thicknesses needed to meet thermal conductivity requirements as determined by the user.

In certain exemplary embodiments, a pump set at a fixed-volume ratio of 2A:1B may be utilized for applying the epoxy-based insulation material. However, other volumetric ratios may be utilized as described herein including without limitation, 1 part component A to 1 part component B, 1.1A:1B, 1.2A:1B, 1.3A:1B, 1.4A:1B, 1.5A:1B, 1.6A:1B, 1.7A:1B, 1.8A:1B, 1.9A:1B, 2A:1B, 3A:1B, 4A:1B, etc. Standard equipment typically includes heated hoses, drum heaters, pressure feed from 50 gallon steel drums or heated hoppers, recirculation system, automatic high-pressure shut-off system. Generally, gel times are temperature dependent. Although optimum working temperatures are between 120° F. and 150° F. (49° C. and 66° C.), other temperatures are contemplated within the scope of the invention. The mixture may be heated to between 70° F. and 350° F., including without limitation between 120° F. and 150° F.

In certain embodiments using hand tools to mix the epoxy-based insulation material, the material may be preheated to approximately 120° F.-150° F. (49° C.-66° C.) and then may be mixed to uniformity taking care not to whip air into the mixture. Other preheating temperatures may be used and are contemplated within the scope of the invention, including without limitation between 70° F. and 350° F., including without limitation between 120° F. and 150° F. In an exemplary embodiment, the epoxy-based insulation material may be poured into a mold. If the material is not preheated, external or supplemental heat may be necessary to initiate and drive the reaction to fully cure the material.

Application Procedures

In certain embodiments of the epoxy-based insulation material of the present invention, heat may be necessary to initiate and drive the reaction for optimum gel and cure times. Heating the material to 120° F.-150° F. (49° C.-66° C.) may be sufficient for this purpose. Other temperatures may be used and are contemplated within the scope of the invention, including without limitation between 70° F. and 350° F. The material may be poured or injected into a mold that has been fitted around the pipe or equipment at a spacing to achieve the desired material thickness. In certain embodiments, reaction injection molding (RIM) may be employed to allow the curing reaction to take place. Because the material has a low viscosity, it can penetrate the mold cavity and surround the piece of equipment being insulated. To prevent leakage of material, the mold-equipment interface may be sealed. To retain heat, the mold may be wrapped in standard insulation during application to help shorten the gel times and de-mold times. Warm air may be circulated through the inside of the pipe or equipment to aid the cure process.

Curing Schedule

In an exemplary embodiment, the curing schedule for the epoxy-based insulation material is described in Table 1 below. The firm set times are exemplary only and are not intended to limit the scope of the invention described herein, but are solely for the purpose of describing the gel times sufficient to allow de-molding in certain exemplary embodiments of the present invention. Different firm set times are contemplated within the scope of the invention, as many variations thereof are possible and also encompassed by the general inventive concepts. The firm set times are approximations provided that the heat is maintained through insulation at the temperature indicated. Applying external heat may shorten the times listed for a faster de-mold. The curing reaction is exothermic, releasing enough heat to leave the material approximately 50° F.-100° F. or more above its initial temperature. For example, if the material starts at 120° F., the material could reach about 180° F., 190° F., 200° F., 210° F., 220° F. or more during cure.

TABLE 1

| Surface Temp. & 50% Relative Humidity | Exemplary Firm Set Times |
| --- | --- |
| 120° F. (49° C.) | approx. 3-9 Hours |
| 150° F. (66° C.) | approx. 1-6 Hours |

EXAMPLES

The following examples illustrate exemplary embodiments and features of various epoxy-based insulation materials encompassed by the general inventive concepts. The examples are given solely for the purpose of illustration and are not to be construed as limiting the present disclosure, as many variations thereof are possible and also encompassed by the general inventive concepts.

Examples 1-2 illustrate certain embodiments of the amine-cured epoxy elastomer matrix. The components of Examples 1 and 2 are listed in Table 2.

TABLE 2

| Component | Percent by vol. kit proportional | Example 1 Component A | Example 1 Component B | Example 1 A + B | Example 2 Component A | Example 2 Component B | Example 2 A + B |
|---|---|---|---|---|---|---|---|
| RS939 | Epoxy Resin Diluent (37-051, GE-36) | 14.00% | 0.00% | 14.00% | 13.95% | 0.00% | 13.95% |
| RS972 | Epalloy 5000 | 35.76% | 0.00% | 35.76% | 35.62% | 0.00% | 35.62% |
| CM353 | Silane A-187/OFS-6040 | 0.03% | 0.00% | 0.03% | 0.03% | 0.00% | 0.03% |
| H401 | S42XHS Glass Bubbles | 16.64% | 7.67% | 24.32% | 16.58% | 7.57% | 24.15% |
| CM976 | Anti-Terra-U 100 | 0.07% | 0.00% | 0.07% | 0.07% | 0.00% | 0.07% |
| CM978 | Tego Wet 270 (Polyether Siloxane) | 0.08% | 0.00% | 0.08% | 0.08% | 0.00% | 0.08% |
| CM389 | Modaflow | 0.08% | 0.00% | 0.08% | 0.08% | 0.00% | 0.08% |
| CM833 | Byk 410 (Mod Urea Soln Thixotrope) | 0.00% | 0.00% | 0.00% | 0.27% | 0.26% | 0.53% |
| CM895 | SPC12 1008 (Amine Siloxane) | 0.00% | 7.69% | 7.69% | 0.00% | 7.59% | 7.59% |
| CM48 | Accelerator (Anc K54/9667/EH-30) | 0.00% | 0.13% | 0.13% | 0.00% | 0.13% | 0.13% |
| CM398 | Epikure 3378 | 0.00% | 2.47% | 2.47% | 0.00% | 2.43% | 2.43% |
| CM945 | Cycloaliphatic Amine (PACM) | 0.00% | 3.97% | 3.97% | 0.00% | 3.92% | 3.92% |
| CM847 | IPD Adduct 718I | 0.00% | 6.16% | 6.16% | 0.00% | 6.08% | 6.08% |
| CM1018 | Jeff. D-2000/Poly-A 27-2000 (Polyoxypropylenediamine) | 0.00% | 5.10% | 5.10% | 0.00% | 5.03% | 5.03% |
| CM720 | Silane OFS-6020 | 0.00% | 0.02% | 0.02% | 0.00% | 0.01% | 0.01% |
| H359 | Aerosil R202 | 0.00% | 0.13% | 0.13% | 0.00% | 0.13% | 0.13% |
| Y97 | Hostaperm Yellow H4G (PY 151 Benzimidazolone) | 0.00% | 0.00% | 0.00% | 0.00% | 0.19% | 0.19% |

All resins are amine or epoxy reactive even those containing polysiloxane.

Performance data for Examples 1 and 2 are summarized in Tables 3-7 below. The performance data is exemplary only and is not intended to limit the scope of the invention described herein, but is provided solely for the purpose of describing how the material performs in the exemplary embodiments described in Examples 1 and 2.

TABLE 3

Thermal Conductivity (Dry)

| Method | ASTM C518 | |
|---|---|---|
| Results | @86° F. (30° C.) | 0.167 W/m° K |
| | @122° F. (50° C.) | 0.167 W/m° K |
| | @140° F. (60° C.) | 0.167 W/m° K |

TABLE 4

Thermal Conductivity (After Exposure)

| Method | ASTM C518 | |
|---|---|---|
| System | Substrate: 2 foot steel pipe Surface Prep: SSPC-SP10 with a 3-4 mils profile Primer: 2 coats of Thermaline 450 at 7-8 mils/coat Examples 1 and 2 (Carboline L8900-1) at 2" thick (approx.) Simulated Subsea Exposure | |
| Exposure | Substrate Temperature: 300° F. (149° C.) Water Temperature: 32° F. (0° C.) Pressure: 4,000-4,500 psi (27.6-31 MPa) | |
| Duration | 90 days (2160 hours) | |
| Results | @86° F./30° C. | 0.166 W/m° K |
| | @122° F./50° C. | 0.166 W/m° K |
| | @140° F./60° C. | 0.166 W/m° K |

TABLE 5

Compressive and Tensile Strength; Elongation & Water Absorption (Subsea Exposure)

| Method | ASTM D630 (Elongation) | | |
|---|---|---|---|
| System | Substrate: 2 foot steel pipe Surface Prep: SSPC-SP10 with a 3-4 mils profile Primer: 2 coats of Thermaline 450 at 7-8 mils/coat Examples 1 and 2 (Carboline L8900-1) at 2" thick (approx.) Simulated Subsea Exposure | | |
| Exposure | Substrate Temperature: 300° F. (149° C.) Water Temperature: 32° F. (0° C.) Pressure: 4,000-4,500 psi (27.6-31 MPa) | | |
| Results | Property | Before Exposure | After Exposure |
| | Tensile Strength | 1,500 psi | 1050 psi |
| | Elongation | 15% | 13.5% |

TABLE 6

Simulated Subsea Exposure - Dimensional Changes

| Method | Reference: ISO/CD 12736 |
|---|---|
| System | Substrate: 2 foot steel pipe Surface Prep: SSPC-SP10 with a 3-4 mils profile Primer: 2 coats of Thermaline 450 at 7-8 mils/coat Examples 1 and 2 (Carboline L8900-1) at 2" thick (approx.) Simulated Subsea Exposure |
| Exposure | Substrate Temperature: 300° F. (149° C.) Water Temperature: 32° F. (0° C.) Pressure: 4,000-4,500 psi (27.6-31 MPa) |

TABLE 6-continued

Simulated Subsea Exposure - Dimensional Changes

Results: General: Negligible dimensional changes or weight gain

| Duration | Weight Gain (Loss) | Length Increase (Decrease) | Circumference Increase (Decrease) |
| --- | --- | --- | --- |
| Pretest | 0 | 0 | 0 |
| 30 days | 0.31% | 1.38% | 2.57% |
| 24 hrs recovery | (0.31%) | 1.10% | 2.57% |
| 48 hrs recovery | (0.31%) | 1.10% | 2.57% |
| 90 days | (0.15%) | 1.10% | (0.24%) |
| 24 hrs recovery | (0.15%) | 1.10% | (0.24%) |
| 168 hrs recovery | 0 | 1.10% | (0.24%) |

TABLE 7

Hardness (Shore D) and Adhesion (After Subsea Exposure)

| | |
| --- | --- |
| Method | ASTM 2240 (Shore D) |
| System | Substrate: 2 foot steel pipe<br>Surface Prep: SSPC-SP10 with a 3-4 mils profile<br>Primer: 2 coats of Thermaline 450 at 7-8 mils/coat<br>Examples 1 and 2 (Carboline L8900-1) at 2" thick (approx.)<br>Simulated Subsea Exposure |
| Exposure | Substrate Temperature: 300° F. (149° C.)<br>Water Temperature: 32° F. (0° C.)<br>Pressure: 4,000-4,500 psi (27.6-31 MPa) |

| Hardness Results | Duration | Shore D |
| --- | --- | --- |
| | Pretest | 61 |
| | 30 days | 62 |
| | 24 hrs recovery | 60 |
| | 48 hrs recovery | 57 |
| | 90 days | 54 |
| | 24 hrs recovery | 57 |
| | 168 hrs recovery | 55 |
| Adhesion | Material could not be removed easily from the test pipe. A band saw was used to cut into the sample longitudinally along the length of the pipe and a screwdriver was used to pry small ¼" pieces from the pipe near the pipe/insulation interface. The resultant pieces showed evidence of Thermaline 450 (primer) on the back of the insulation pieces and Thermaline 450 still remained on the pipe sample surface. The primer coating had "split" in the removal process. This is typical of Thermaline 450 to show cohesive failure rather than adhesive failure. The insulation could not be separated from the Thermaline 450 primer coat.<br>Thermaline ® 450 is a highly cross-linked, glass flake-filled epoxy polymer that offers exceptional barrier protection and resistance to wet/dry cycling at elevated temperatures, available from Carboline Company. | |

The foregoing description of the preferred embodiments of the present invention has been presented for purposes of illustration and description. It is not intended to be exhaustive or to limit the invention to the precise form disclosed. Modifications or variations are possible in light of the above teachings. Epoxy-based insulation in accordance with the present invention may include any combination or sub-combination of the features or concepts disclosed by the present application.

The embodiments were chosen and described to illustrate the principles of the invention and its practical application. It is clear that modifications and variations are within the scope of the invention as determined by the appended claims. The preferred embodiments do not and are not intended to limit the ordinary meaning of the claims in their fair and broad interpretation in any way.

The invention claimed is:

1. An epoxy-based insulation material for insulating a subsea production apparatus comprising:
   an amine-cured epoxy elastomer matrix, including between 1% and 10% aminopolysiloxane;
   and a plurality of non-metallic beads suspended in the matrix; wherein the insulation material is located on the subsea production apparatus to thermally insulate a hydrocarbon fluid from sea water.

2. The epoxy-based insulation material according to claim 1, wherein the amine-cured epoxy elastomer matrix is formed by a reaction of a two-component epoxy having component A and component B;
   wherein component A comprises an epoxy resin diluent, an epoxy resin, a silane, a dispersive additive, a polyether siloxane, and an acrylic polymer,
   wherein component B comprises the aminopolysiloxane, at least one curing agent, an alkoxysilane, polyoxypropylenediamine and at least one thickening agent.

3. The epoxy-based insulation material of claim 2, wherein the curing agent is a polyamine.

4. The epoxy-based insulation material of claim 1, wherein the amine-cured epoxy elastomer matrix further comprises modified urea.

5. The epoxy-based insulation material of claim 1, wherein the amine-cured epoxy elastomer matrix further comprises 2,4,6-tri(dimethylaminomethyl) phenol.

6. The epoxy-based insulation material of claim 1, wherein the amine-cured epoxy elastomer matrix further comprises cycloaliphatic amine.

7. The epoxy-based insulation material of claim 1, wherein the amine-cured epoxy elastomer matrix further comprises benzimidazolone pigment.

8. The epoxy-based insulation material according to claim 1, having an elongation of at least 15%.

9. The epoxy-based insulation material according to claim 1, having a Shore D hardness of between 20 to 85 before being exposed to water.

10. The epoxy-based insulation material according to claim 1, having a Shore D hardness of between 20 to 85 after being exposed to water at 250° F. for 5 weeks.

11. The epoxy-based insulation material according to claim 1, having a tensile strength of between 500 to 5,000 psi.

12. The epoxy-based insulation material according to claim 1, having a thermal conductivity of between 0.0835 to 0.334 W/m° K at between 86° F. and 140° F.

* * * * *